US007822957B2

(12) United States Patent
Takahashi

(10) Patent No.: US 7,822,957 B2
(45) Date of Patent: Oct. 26, 2010

(54) METHOD FOR CARRYING OUT AN INFORMATION PROCESSING IN ACCORDANCE WITH FIRMWARE IN A PLURALITY OF CHIPS

(75) Inventor: Tetsu Takahashi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 613 days.

(21) Appl. No.: 11/344,096

(22) Filed: Feb. 1, 2006

(65) Prior Publication Data

US 2007/0055858 A1    Mar. 8, 2007

(30) Foreign Application Priority Data

Sep. 2, 2005    (JP)    ............................. 2005-255692

(51) Int. Cl.
*G06F 9/00* (2006.01)
(52) U.S. Cl. ............................................. 713/1; 713/2
(58) Field of Classification Search .................... 713/1, 713/2
See application file for complete search history.

(56) References Cited

U.S. PATENT DOCUMENTS 6,785,272 B1 *   8/2004   Sugihara ..................... 370/386

2004/0261072 A1 * 12/2004 Herle ........................... 717/171
2005/0240686 A1 * 10/2005 Kashiwagi ........................ 710/8

FOREIGN PATENT DOCUMENTS

| JP | 04-318650 | | 11/1992 |
| JP | 11-338703 | * | 12/1999 |
| JP | 11-338703 A | | 12/1999 |
| JP | 2000-010784 A | | 1/2000 |
| JP | 2000-259419 A | | 9/2000 |
| JP | 2001-117760 A | | 4/2001 |
| JP | 2005-135176 | | 5/2005 |
| WO | WO-01/27753 A2 | | 4/2001 |

OTHER PUBLICATIONS

Office Action mailed by the Japanese Patent Office in connection with application No. JP 2005-255692. Nov. 17, 2009. Translation provided.
"Partial European Search Report", mailed by EPO and corresponding to European application No. 06250458.4 on Apr. 28, 2010.

* cited by examiner

*Primary Examiner*—Chun Cao
(74) *Attorney, Agent, or Firm*—Fujitsu Patent Center

(57) ABSTRACT

To enable a start in a short period of time in an apparatus including a plurality of chips. In chip carrying out information processing in accordance with a firmware which is at least a part of the firmware common to the other chip, each of the chips receives the firmware, refers to setting information, and transfers the firmware to the other chip based on the setting information.

23 Claims, 13 Drawing Sheets

METHOD FOR CARRYING OUT AN INFORMATION PROCESSING IN ACCORDANCE WITH FIRMWARE IN A PLURALITY OF CHIPS

CROSS-REFERENCE TO RELATED APPLICATIONS

This application is based upon and claims priority of Japanese Patent Application No. JP2005-255692, filed in Sep. 2, 2005 the contents being incorporated herein by reference.

BACKGROUND OF THE INVENTION

The present invention relates to a technology for downloading a firmware to a plurality of chips (processors) to start the firmware.

In recent years, in a DVD recorder and a TV capture system of PC, demands for apparatus capable of recording programs of a plurality of channels at the same time have been increased. Typically, at a time of recording, a compression of data to an MPEG format is executed, and then recorded on a recording medium. However, when a plurality of channels are desired to be recorded at the same time, a plurality of chips (LSIs) for the compression are used, unless otherwise one LSI is required to have a function for compressing the plurality of channels. On the other hand, as a market request, demands for the apparatus having a function of recording a program of a single channel are still large.

Further, as the conventional techniques, which are related to this application invention, there are given techniques disclosed in the following patent documents 1 and 2, for instance.

[Patent document 1] JP 04-318650 A
[Patent document 2] JP 2005-135176 A

SUMMARY OF THE INVENTION

However, when giving the function for compressing the data of the plurality of channels to one chip, an application of the chip to the apparatus capable of compressing the data of the single channel only, which still has a large market request, is redundant.

For this reason, there is generally employed such a method that the plurality of chips capable of compressing the data of one channel is used for the necessary numbers in correspondence with the number of the channels. However, when the plurality of chips is installed, the plurality of firmware for the respective chips must be downloaded at the time of starting the respective chips (when a power source is turned on or a function is operated), resulting in such a problem that a time is required for the start.

Thus, the present invention enables the short-time start in the apparatus installing therein the plurality of chips.

In order to solve the problems, the present invention employs the following configuration.

That is, a chip according to the present invention carrying out an information processing in accordance with a firmware which is at least a part of firmware common to the other chip, the chip including: a receiving unit receiving the firmware; a referring unit referring to setting information; and a transferring unit transferring the firmware to the other chip based on the setting information.

Further, an apparatus according to the present invention includes a plurality of chips, the chips carrying out an information processing in accordance with a firmware which is at least a part of firmware common to the other chip, each of the chips including:
a receiving unit receiving the firmware;
a referring unit referring to setting information; and
a transferring unit transferring the firmware to the other chip based on the setting information.

The chip may include changing unit changing the setting information to setting information intended for the chip of a transfer destination by predetermine processing, when the firmware has the setting information.

When the setting information indicates a presence or absence of a slave chip, the transferring unit may transfer the firmware when there is the slave chip, and may not transfer the firmware when there is no slave chip.

When the setting information indicates the number of the slave chips, the changing unit may subtract the number of the chips.

The transferring unit may transfer the firmware in parallel to a reception of the firmware through the receiving unit.

The referring unit may refer to a state of the pin indicating the setting information.

Further, a starting method for chips according to the present invention, a chip carrying out information processing in accordance with a firmware which is at least a part of the firmware common to the other chip, the method including: receiving the firmware; referring to setting information; and transferring the firmware to the other chip based on the setting information.

Further, a starting method for a plurality of chips according to the present invention relates to a method of carrying out an information processing, the plurality of chips carrying out information processing in accordance with a firmware which is at least a part of the firmware common to the other chip, the method including: receiving the firmware by the respective chips; referring to setting information; and transferring the firmware to the other chip based on the setting information.

The starting method may change the setting information to setting information intended for the chip of a transfer destination by predetermine processing, when the firmware has the setting information.

When the setting information indicates a presence or absence of a slave chip, the starting method may transfer the firmware when there is the slave chip, and may not transfer the firmware when there is no slave chip.

When the setting information indicates the number of the slave chips, the starting method may subtract the number of the chips when changing the setting information.

The starting method may transfer the firmware in parallel to a reception of the firmware.

When referring to the setting information, the starting method of the chip may refer to a state of the pin indicating the setting information.

Further, the present invention may be a program (firmware or boot loader) for instructing the respective chips to execute the starting method of the chips. Moreover, the present invention may be an information processing device (e.g. Computer, apparatus, chip) readable recording medium on which the program is recorded. The function may be provided by reading-in the program recorded on the recording medium and by executing the program.

In this case, the information processing device readable recording medium implies the recording medium that can accumulate information such as data and program through an electric, magnetic, optical, mechanical or chemical action, and can read out the information from the information processing device. Of the recording media, examples of the medium that can be removed from the information processing device include a flexible disc, a magneto-optical disc, CD-ROM, CD-R/W, DVD, DATA, an 8-mm tape, and a memory card.

Also, examples of the recording medium fixed to the information processing device include a hard disk, a RAM and a ROM (Read Only Memory).

According to the present invention, even in the apparatus that includes the plurality of chips, the technique that enables the start of the chips in a short period of time can be provided.

DETAILED DESCRIPTION OF THE PREFERRED EMBODIMENT

Principle of the Invention

In the architecture of the typical personal computer, even in the single channel or in the plurality of channels, the generated stream is outputted to a PCI bus (or USB or the like), and recorded through a main memory or a chip set in the recording medium.

In the case of the system for compressing the plurality of channels in the plurality of chips, when the configuration for sending the stream from the PCI interface possessed by each chip is employed, the board is divided into a plurality of elements. Thus, the cost is increased. Moreover, since the plurality of slots are occupied, this is not so preferable. As one of the solving methods, for example, the system shown in FIG. 1 is considered.

Figure 1:
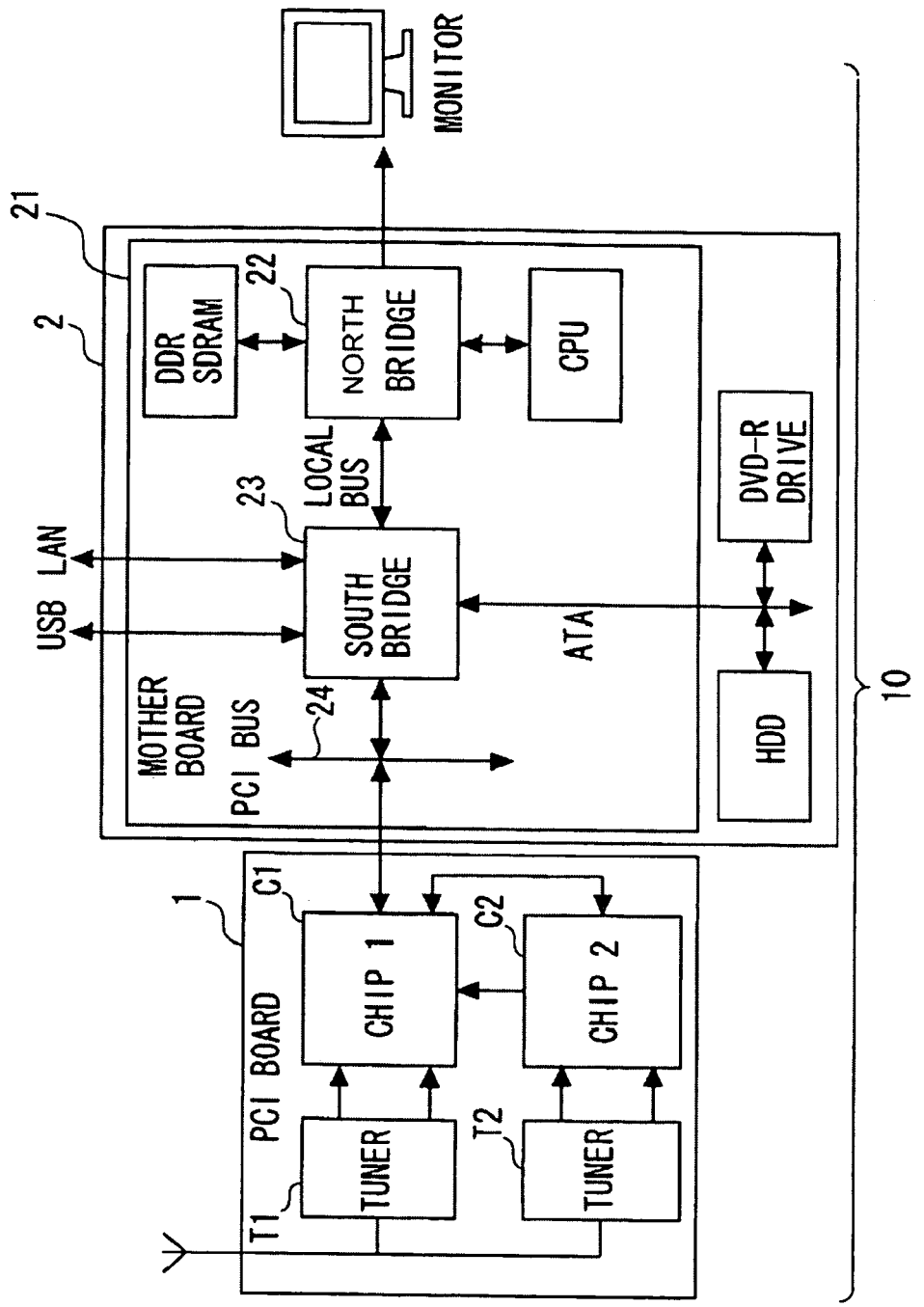
FIG. 1 is a schematic view of a system including an apparatus according to the present invention.

In a system 30 of FIG. 1, an expansion board 1 for outputting the streams of the plurality of channels is installed in one of the PCI slots of a computer (host) 2. The expansion board 1 has tuners T1 and T2 and chips C1 and C2 corresponding to the plurality of channels (two in FIG. 1), and image signals and voice signals from the respective tuners T1 and T2 are compressed by the respective chips C1 and C2, respectively, and the streams of the predetermined types are generated. Then, the chip C1 outputs this stream from the PCI interface directly to a PCI bus 24 on a host side. On the other hand, the chip C2 sends the stream to the chip C1 without using the own PCI interface, and the stream is outputted from the PCI interface of the chip C1 to the PCI bus 24 on the host side.

In this system 30, the chip C1 and the chip C2 are different in the operation mode as to whether the stream is outputted from the PCI interface or transferred to the other chip. Thus, some means is required to specify the mode. For this reason, the firmware in which the operation modes are different but the basic parts are same are downloaded to the chip C1 and the chip C2, respectively.

However, when the configuration for connecting ROM storing each of the firmware to each chip and downloading each firmware from the ROM is employed, two ROMs are required.

Figure 12:
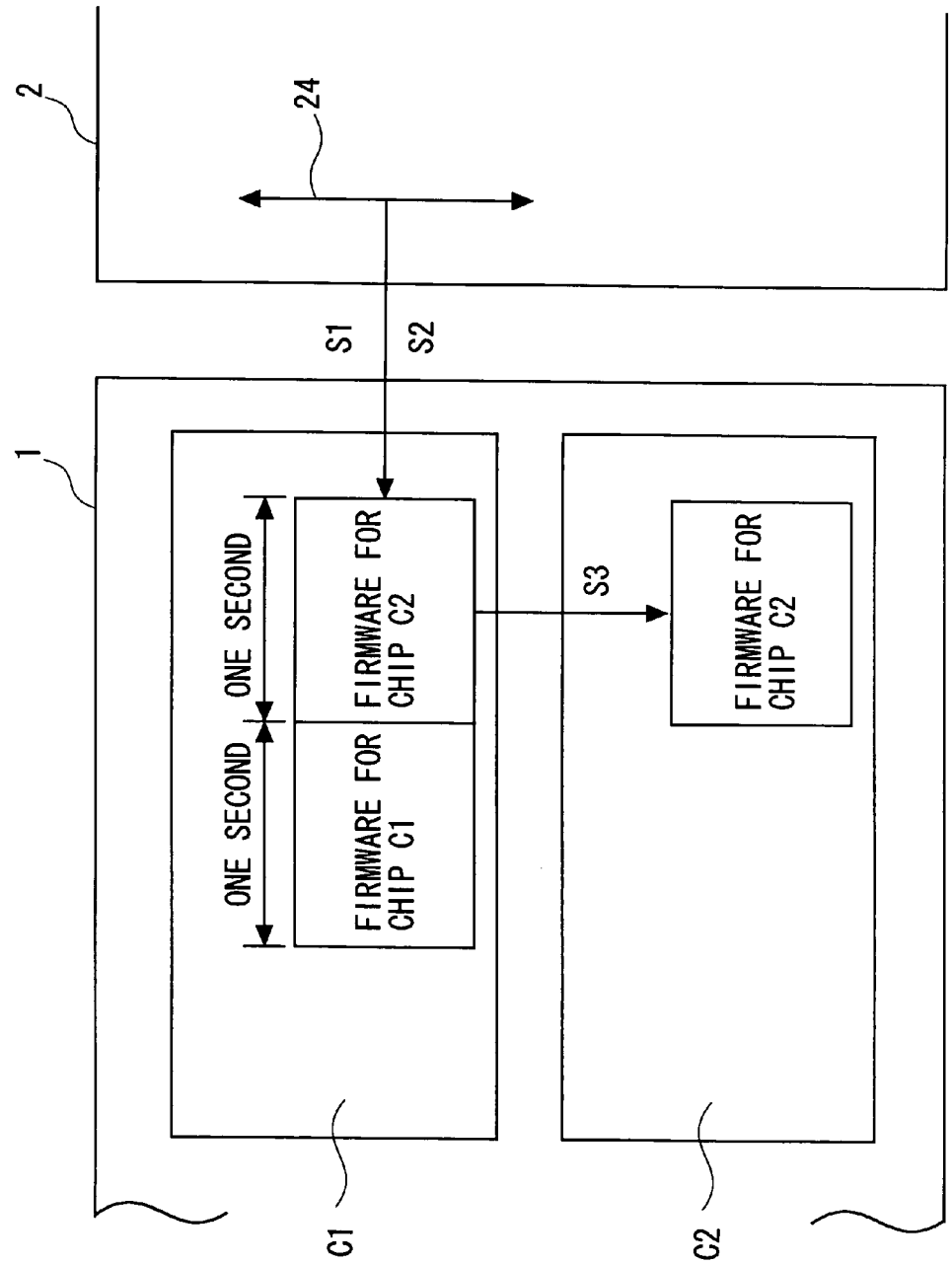
FIG. 12 is a view showing a comparative example of a download time.

Also, in the configuration for downloading the firmware for the two chips through the PCI bus 24 from the host 2, time is required to download the firmware, and time until the start becomes long. FIG. 12 is an explanation diagram in the case of downloading the firmware for the two chips from the host 2 through the PCI bus 24. Here, when the time required to download the firmware for one chip is assumed to be 1 second for convenience, it takes two seconds to download the firmware for the two chips C1 and C2 from the host 2 to the chip C1 (S1 and S2), and it takes 1 seconds for CPU of the chip C1 to download the firmware for the chip C2 to the chip C2 (S3). Thus, a total of 3 seconds is required to download the firmware.

Figure 13:
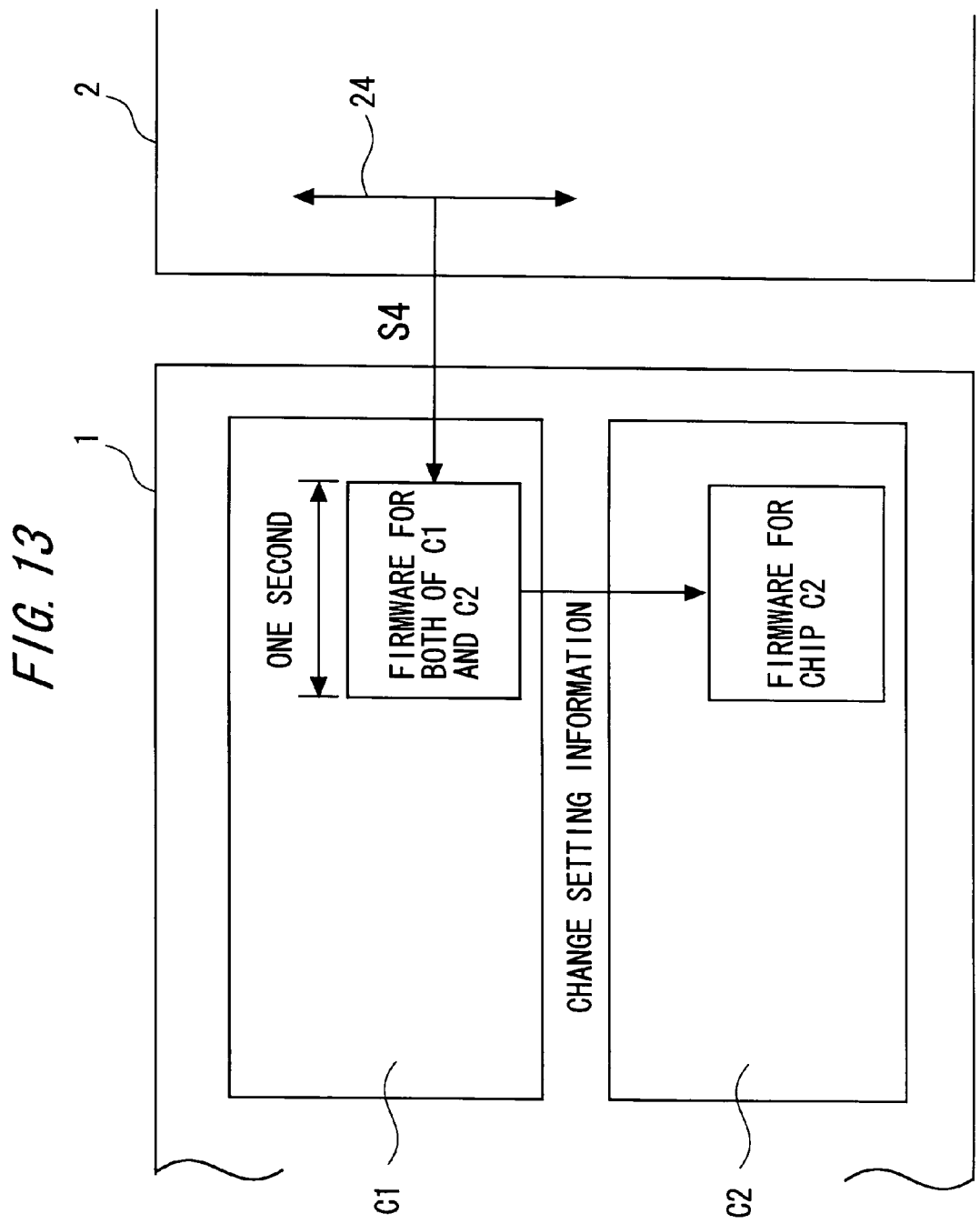
FIG. 13 is a principle explanation view of the present invention.

So, in the present invention, as shown in FIG. 13, the firmware for the chip C1 is downloaded from the host 2 to the chip C1 (S4). The chip C1 changes operation mode of the firmware for the chip C1 to the operation mode of firmware for the chip C2 and downloads the firmware to the chip C2 (S5). As a result, it takes 2 seconds of S4 and S5 for downloading, which can reduce the start time. Note that, the download time is for the exemplification. Actually, depending on the size of the firmware, the communication speed of the local bus (PCI bus), the number of the channels (the number of the chips) and the like, the effect of the time reduction is different. However, under the same condition, the present invention shown in FIG. 13 makes the download time shorter than the method shown in FIG. 12.

First Embodiment

Hereinafter, with reference to the drawings, the best mode for carrying out the invention is specifically described. The configurations of the following embodiments are the exemplifications, and the present invention is not limited to the configurations of the embodiments.

The system configuration of this embodiment is equal to that of FIG. 1 as described above, and an expansion board (tuner card) 1 is mounted in a PCI slot of the host 2.

A mother board 21 of the host 2 includes a CPU 20, a main memory (RAM), LSIs 22 and 23, a PCI bus 24, and the like. The LSIs 22 and 23 are the so-called chip set for managing the transmission/reception of data among the CPU 20, the RAM, the expansion board and the like. The LSI 22 has a function for connecting the CPU 20 and a local bus and a graphic function for outputting an image signal to a monitor terminal. Also, the LSI 23 has functions of a so-called PCI controller to carry out the control of the local bus and the like, a USB controller, an IDE controller, a LAN controller, and the like.

Figure 2:
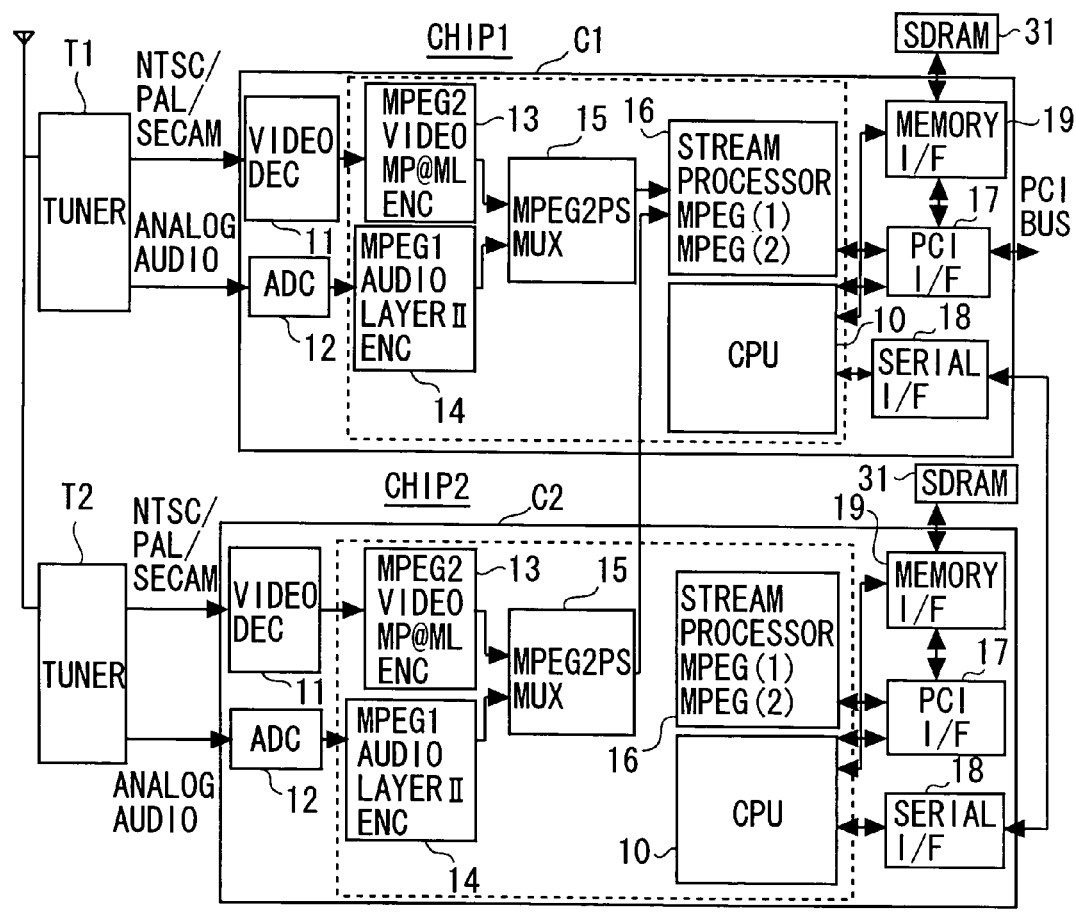
FIG. 2 is a block diagram of a chip and the like which are mounted in an expansion board.

FIG. 2 is a block diagram of the chip and the like contained in the expansion board 1. The chip C1 includes, digital converting sections 11 and 12 for converting the image signal and audio signal from a tuner T1 into digital signals, encoders 13 and 14 for encoding the digital signals to a predetermined compression type (the MPEG in this example), an MUX 15 for multiplexing the image signal and voice signal encoded to this predetermined compression type and generating a stream, and a stream processor 16 for arbitrating the stream from the MUX and the stream from the other chip and outputting through a PCI interface 17 to the host 2.

Also, the chip C1 includes a CPU 10, a serial interface 18, and a memory interface 19. An SDRAM (storage unit) 31 is connected to the memory interface 19, and an access to the SDRAM 31 from the CPU 10 and an access to the SDRAM 31 from the host 2 are possible. Also, the serial interface 18 transfers the information of the firmware and the like to the other chip 1, with the control of the CPU 10 of each board 1. When the serial receives the data, a serial interruption is performed on the built-in CPU 10 for each of one-byte data reception.

Note that, the respective sections for processing the digital signals may be constituted by the hardware or may be configured by the CPU 10 in the software. In this example, since the CPU 10 carries out the process in accordance with the firmware, the functions of the encoders 13 and 14, the MUX 15, and the stream processor 16 (the range indicated by dotted lines) are attained.

Also, the CPU 10, by executing the process in accordance with the built-in boot loader and the firmware, attains the functions of a reception unit, a reference unit, a transfer unit, and a changing unit.

This reception unit receives (downloads) the firmware common to the other chips transferred through the PCI interface 17 from the host 2 or through the serial interface 18 from a master chip in accordance with the setting information, and stores the firmware in the SDRAM 31.

The reference unit refers to the setting information included in a header area of the firmware.

The transfer unit transfers the firmware to the other chip based on the setting information.

The changing unit changes the setting information to setting information specific to the chip of a transfer destination by predetermined processing.

Note that, in this embodiment, the CPU attains the functions of the units in accordance with the software. However, the respective unit may be configured by the hardware, and the respective functions may be attained.

The chip C2, although having the same configuration as the chip C1, outputs (transfers) the stream to the chip C1 without outputting from the PCI interface 17 by making the operation mode different from that of the chip C1. Note that, FIG. 2 shows the functions of the respective sections so as to transfer the stream from the MUX 15 of the chip C2 to the stream processor 16 of the chip C1. However, in the chips C1 and C2 in this example, the CPU 10 attains the functions of the MUX 15 and the stream processor 16 in accordance with the software. Thus, actually, the CPU 10 of the chip C2 transfers the stream through the serial interface 18 to the CPU 10 of the chip C1.

Also, the chip C1 and the chip C2 judge whether the firmware received from the host 2 is transferred to the other chip or received from the other chip, based on the operation mode. In this example, the chip C1 for transferring the firmware is also referred to a master chip, and the chip C2 for receiving the firmware is also referred to as a slave chip.

Figure 3:
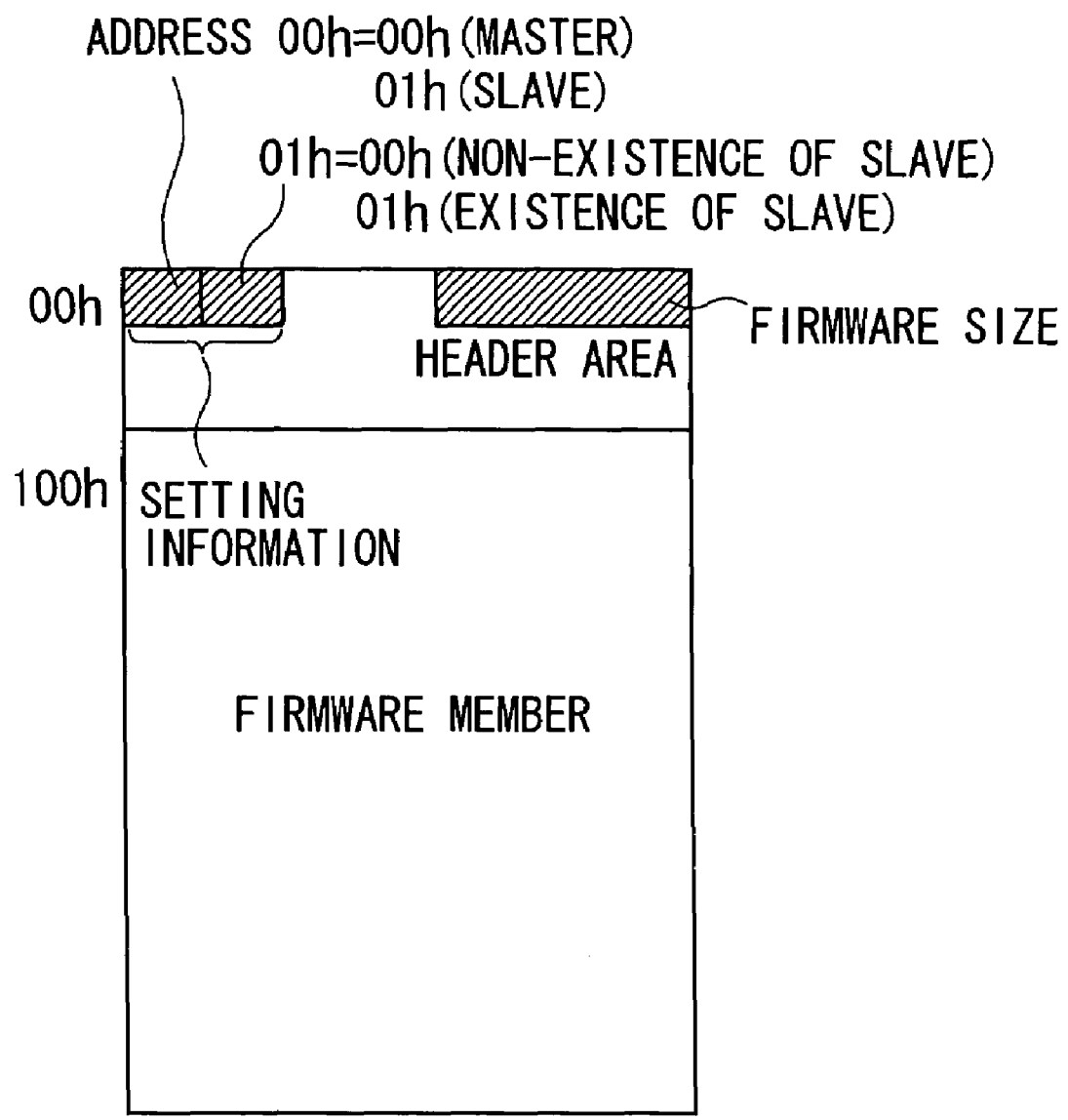
FIG. 3 is a view showing a format of a firmware.

FIG. 3 is a diagram showing the format of the firmware. The firmware is composed of the header area and the data area (the firmware member), and this header area includes the setting information, the firmware size, and the like. The setting information is information to set the operation mode. This indicates the master chip if an address 00h of the firmware is 00h, indicates the slave chip if the address 00h is 01h, indicates that there is not the slave chip if the address 01h of the firmware is 00h, and indicates that there is the slave chip if the address 01h of firmware is 01h.

Figure 4:
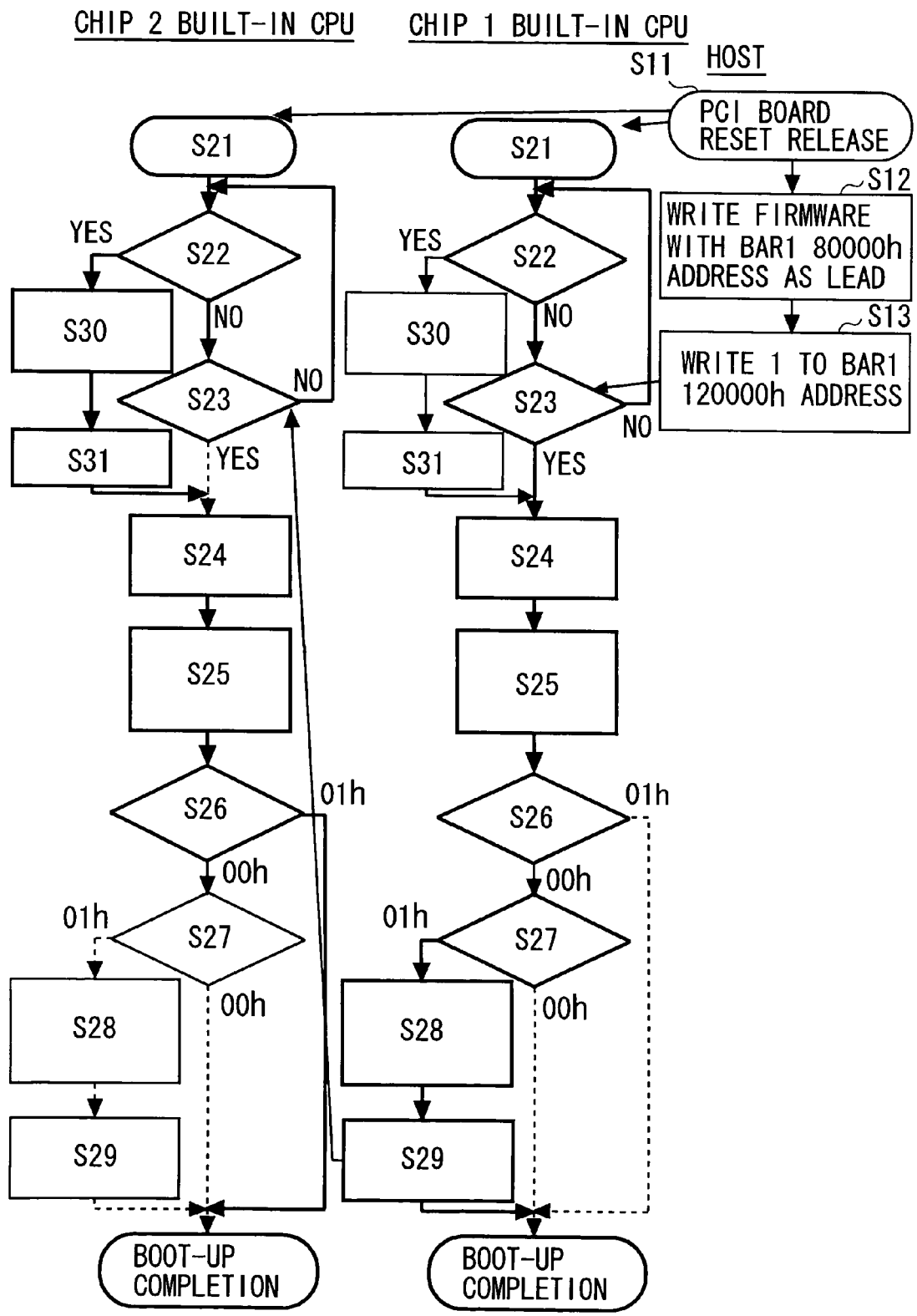
FIG. 4 is a flowchart of a starting process in an entire system.
Figure 5:
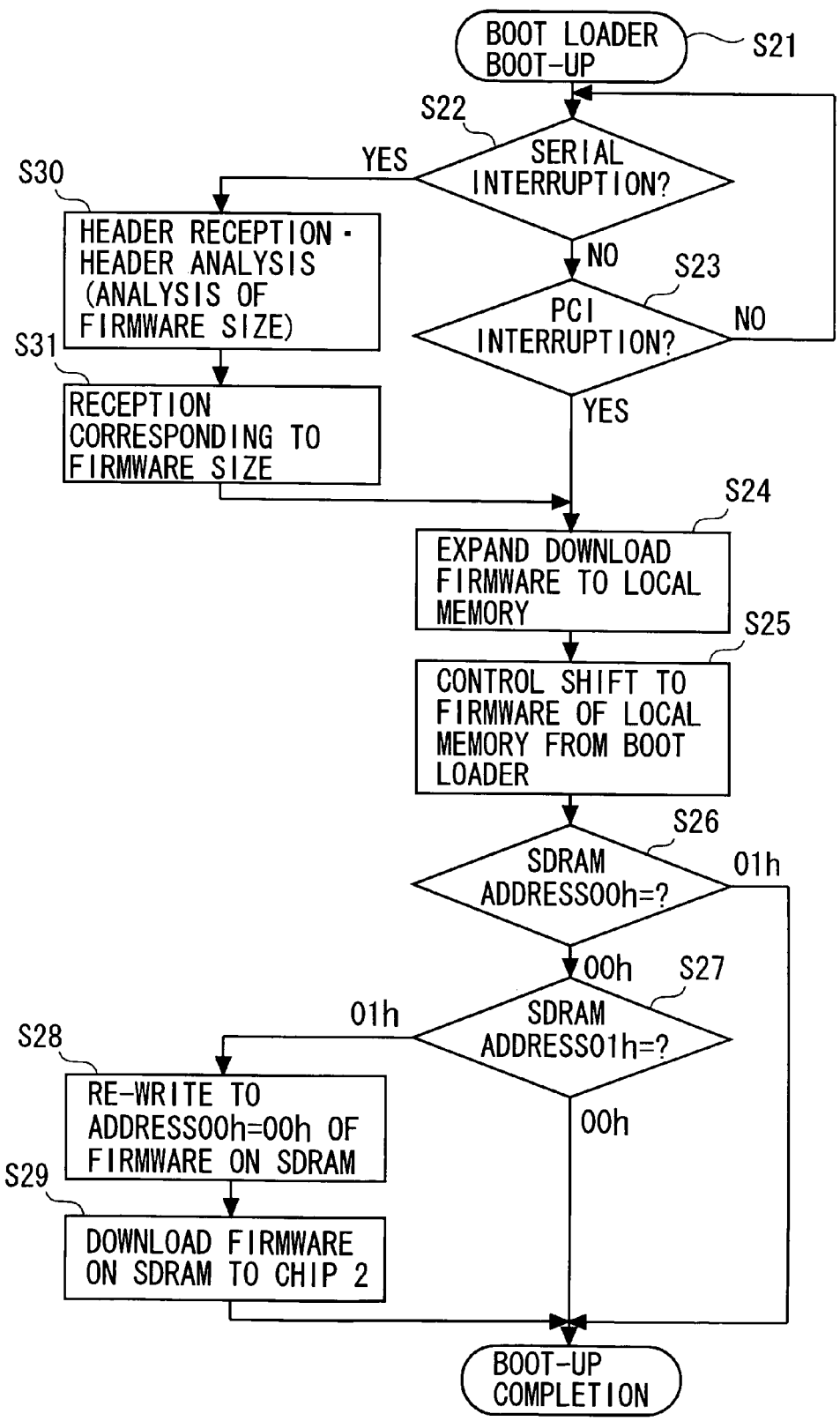
FIG. 5 is a flowchart of a starting process in each chip.

Next, the starting methods executed in the system 30 will be explained by using FIGS. 4 and 5. FIG. 4 is a flowchart of the starting process in the entire system, and FIG. 5 is a flowchart of the starting process in the respective chips.

The host 2 begins the start of the expansion board 1 (the chip C1 and the chip C2) when a reset state is released by the turning-on (start) of a power source, the re-start, the recovery from a standby state, or the like (the step 11, hereafter, abbreviated as S11).

Also, the host 2 accesses the expansion board 1 through the PCI bus 24, assigns a BAR1 area to the SDRAM 31 of the chip C1, and writes the firmware to, for example, an 80000h address of this BAR1 area (S12).

Then, the host 2 sets a flag for a predetermined register of the PCI, for example, writes 1 to a memory inside the PCI interface 17, and therefore performs the PCI interruption and begins the expansion of the firmware (S13).

On the other hand, the chip C1 begins the starting process through the boot loader in response to the reset release (the turning-on of the power source or the like) of the host 2, as shown in FIG. 5 (S21). In this example, the CPU 10 reads the boot loader (the software for the start) from the built-in ROM, and begins the starting process in accordance with this software.

At first, the CPU 10 of the chip C1 checks whether or not the serial interruption is performed (S22). If there is not the serial interruption, the CPU 10 checks whether or not a PCI interruption is performed (S23). That is, the CPU 10 refers to whether or not the flag for the PCI interruption is set for the memory of the PCI interface 17. Here, the CPU 10 returns to the step 22 if there is not the PCI interruption, and if there is the PCI interruption, reads the firmware from the SDPAM 31 at this time, and expands to a local memory inside the CPU 10 (S24).

After the expansion, the CPU 10 executes the firmware on this local memory, and shifts the control from the boot loader to the firmware (S25).

In accordance with this firmware, the CPU 10 refers to the setting information and recognizes the operation mode (S26 and S27). For example, the CPU 10 reads the address 00h of the SDRAM 31. If this value is 01h, it is recognized as the slave chip, and the CPU 10 stops the starting process. If this value is 00h, it is recognizes as the master chip, and the CPU 10 checks the presence or absence of the slave chip. Here, if the value of the address 01h is 00h, this indicates that there is not the slave chip, and if the value is 01h, this indicates that there is the slave chip.

The chip C1 in this example is the master chip, and the slave chip (chip C2) is connected. Thus, in the setting information from the host 2, the value of the address 00h is 00h, and the value of the address 01h is 01h. Hence, the CPU 10 judges that there is the slave chip at the step 27, and changes the setting information on the SDRAM for the slave chip (S28). That is, the CPU 10 rewrites the value of the address 00h to 01h.

Then, the CPU 10 of the chip C1 transmits the firmware after the rewriting from the SDRAM 31 through the serial interface 18 to the chip C2 (S29).

Also, the chip C1, if recognizing as the master chip at the step 26, sets the operation mode so as to output the generated stream or the stream received from the other chip C2 from the PCI interface 17 to the host 2.

On the other hand, the chip C2 begins the starting process through the boot loader similarly to the chip C1, in response to the reset release (the turning-on of the power source or the like) of the host 2 (S21) and sequentially checks the serial interruption and the PCI interruption (S22 and S23). Note that, at the time of this starting process, the chip C2 uses the same program (the boot loader and the firmware) as the chip C1 except the setting information. However, the appearing step is different owing to the difference of the operation mode. For example, the chip C2 in this example is the slave chip, and the PCI interface 17 is not used. Thus, the PCI interruption is not performed, and the chip C2 becomes in a wait state until the serial interruption is performed.

Here, when the chip C1 transfers the firmware to the chip C2 as described above, the serial interruption is performed on the CPU 10 of the chip C2. At the timing of this serial interruption, the CPU 10 receives and analyzes the header and recognizes the size of the firmware (S30). Then, the CPU 10 receives the firmware corresponding to this size and stores in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory and shifts the control from the boot loader to the firmware (S25).

In accordance with this firmware, the CPU 10 refers to the setting information on the SDRAM 31 and recognizes the operation mode (S26). The chip C2 in this example is the slave chip, and as the setting information, the value of the address 00h is 01h. Thus, the CPU 10 judges as the slave chip at the step 26 and completes the starting process.

As described above, according to this embodiment, in the expansion board having the two chips for generating the streams of the 2 channels, by not downloading the two firmware from the host 2 for the two chips but transferring one firmware, the download time is made shorter, and the start time of the expansion board is reduced.

Also, the starting process is switched based on the operation mode. Thus, even in the case of the master chip or slave chip, the chip of the same configuration can be used, which can attain the reduction in the start time while the general purpose property is maintained.

Second Embodiment

Figure 6:
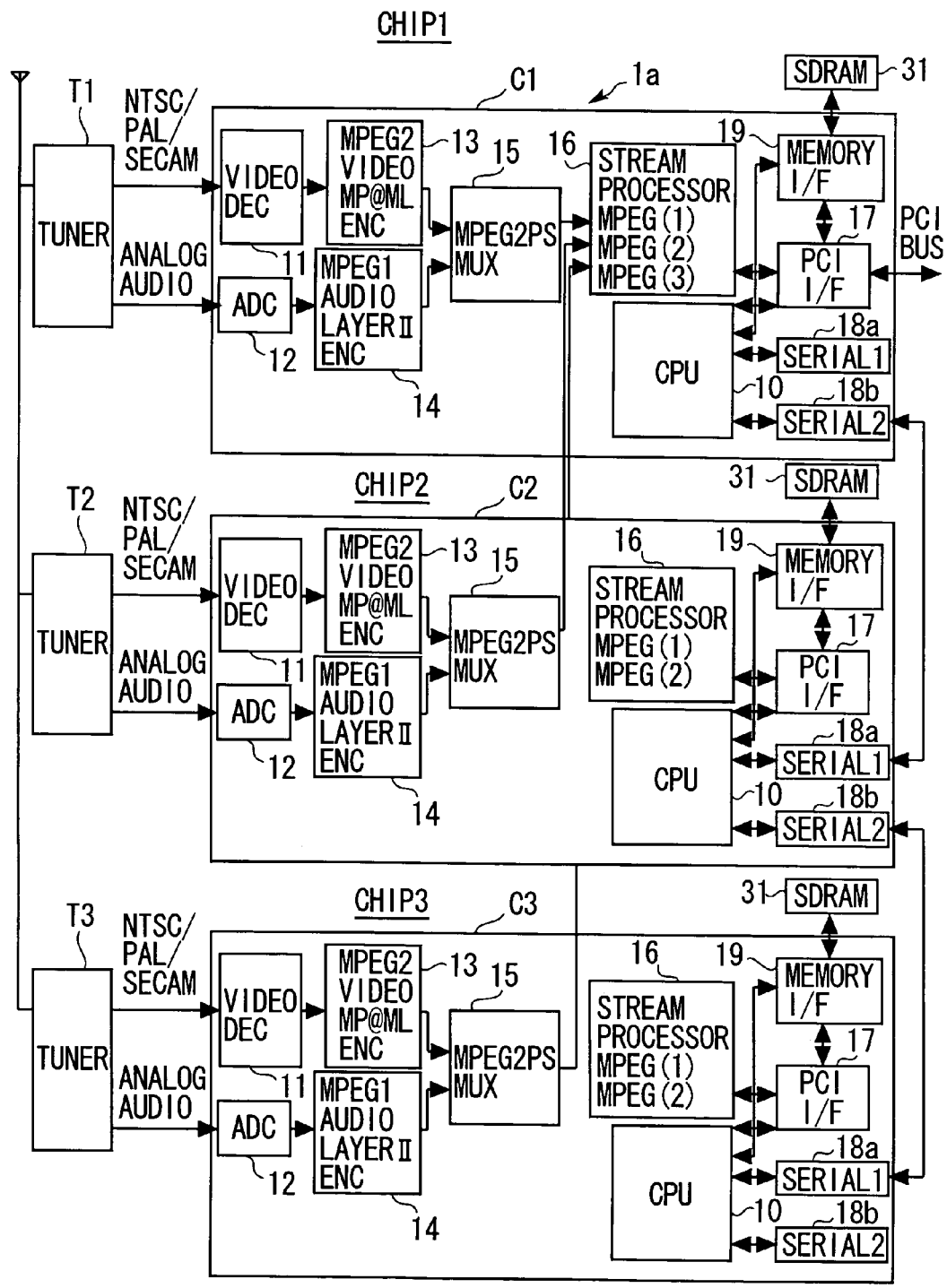
FIG. 6 is a block diagram of an expansion board according to a second embodiment.
Figure 7:
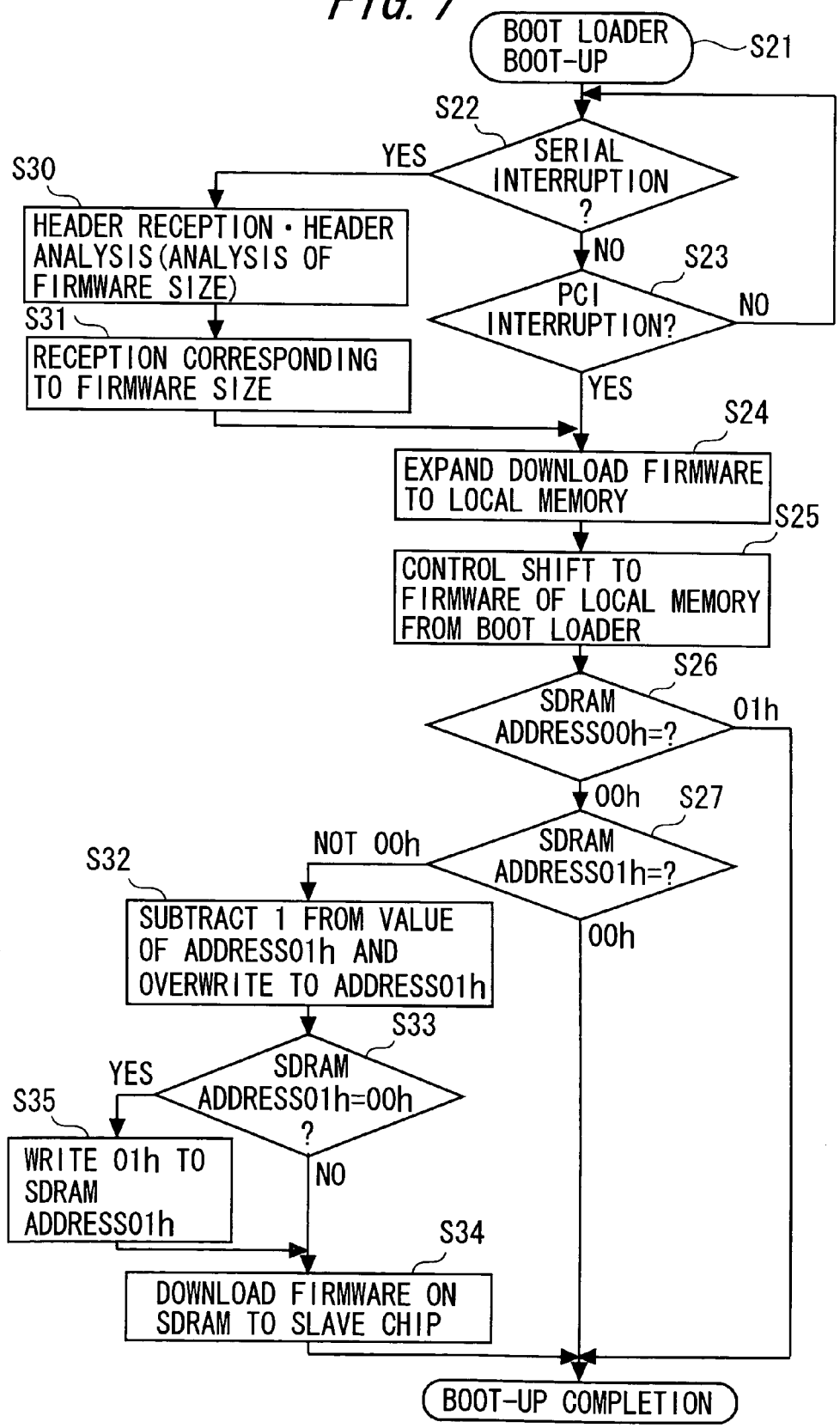
FIG. 7 is a flowchart of a starting process according to the second embodiment.

FIG. 6 is a block diagram of an expansion board according to the second embodiment, and FIG. 7 is a flowchart of a starting process according to the second embodiment. This embodiment is different in that the number of the chips is not two and three or more chips are contained, as compared with the first embodiment. Note that, in this embodiment, the same symbols are given to the same components as those of the first embodiment, and the re-explanations are partially omitted.

An expansion board 1a according to this embodiment includes chips C1, C2, and C3 of the same configuration as shown in FIG. 6, in a moniliform manner. The chip C2, although serving as the slave chip for the chip C1, serves as the master chip for the chip C3. Each of the chips C1, C2, and C3 is substantially equal to the chip in the first embodiment (FIG. 2). However, the chip according to this embodiment includes the interfaces of a plurality of groups, such as a serial interface 18a connected to the chip on the upstream side (master chip) and a serial interface 18b connected to the chip on the downstream side (slave chip).

The host 2 begins starting the expansion board 1a (the chips C1, C2, and C3) (S11) when the reset state is released, and writes the firmware to the SDRAM 31 of the chip C1 through the PCI bus 24 (S12).

Then, the host 2 sets a flag for a predetermined register of the PCI, and performs the PCI interruption and begins the expansion of the firmware (S13).

On the other hand, the chip C1 begins the starting process through the boot loader in response to the reset release (the turning-on of the power source or the like) of the host 2, as shown in FIG. 7 (S21).

At first, the CPU 10 of the chip C1 checks whether or not the serial interruption is performed (S22). If there is not the serial interruption, the CPU 10 checks whether or not a PCI interruption is performed (S23). That is, the CPU 10 refers to whether or not the flag for the PCI interruption is set for the memory of the PCI interface 17. Here, the CPU 10 returns to the step 22 if there is not the PCI interruption, and if there is the PCI interruption, reads the firmware from the SDRAM 31 at this time, and expands to a local memory inside the CPU 10 (S24).

After the expansion, the CPU 10 executes the firmware on this local memory, and shifts the control from the boot loader to the firmware (S25).

In accordance with this firmware, the CPU 10 refers to the setting information and recognizes the operation mode (S26 and S27). For example, the CPU 10 reads the address 00h of the SDRAM 31, and if this value is 01h, it is not recognizes as the master chip, (the firmware needs not to be transferred) and the CPU 10 stops the starting process, and if this value is 00h, it is recognized as the master chip, and the CPU 10 checks the presence or absence of the slave chip. Here, the value of the address 01h of the SDRAM 31 indicates the number of the slave chips.

The chip C1 in this example serves as the master chip, and the slave chip (the chip 2) is connected. Thus, in the setting information from the host 2, the value of the address 00h is 00h, and the value of the address 01h is 02h. Hence, the CPU 10 judges that there are the two slave chips at the step 27, and changes the setting information on the SDRAM for the slave chip. Specifically, the CPU 10 subtracts the value of the address 01h (S32), and judges whether or not the value of the address 01h becomes 00h by the subtraction (S33). In the case of the chip C1, at the step 33, the value of the address 01h becomes 01h even if 1 is subtracted from 02h. Thus, without any change in the address 00h, the step shifts to a step S34. The firmware on the SDRAM is downloaded from the serial interface 18 to the slave chip C2, and the starting process is completed.

Also, the chip C1, if recognizing that the PCI interruption is performed at the step 23, sets the operation mode so as to output the generated stream or the stream received from the other chip C2 from the PCI interface 17 to the host 2.

On the other hand, the chip C2 begins the starting process through the boot loader similarly to the chip C1, in response to the reset release (the turning-on of the power source or the like) of the host 2 (S21) and sequentially checks the serial interruption and the PCI interruption (S22 and S23).

Here, when the chip C1 transfers the firmware to the chip C2 as described above, the serial interruption is performed on the CPU 10 of the chip C2. At the timing of this serial interruption, the CPU 10 of the chip C2 receives and analyzes the header and recognizes the size of the firmware (S30). Then, the CPU 10 receives the firmware corresponding to this size and stores in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory and shifts the control from the boot loader to the firmware (S25).

In accordance with this firmware, the CPU 10 refers to the setting information on the SDRAM 31 and recognizes the operation mode (S26). The chip C2 in this example serves as the master chip for the chip C3, and the slave chip (the chip C2) is connected. Thus, in the setting information from the chip C1, the value of the address 00h is 00h, and the value of the address 01h is 01h. Hence, the CPU 10 judges that there is one slave chip at the step 27, and changes the setting information on the SDRAM for the slave chip. Specifically, the value of the address 01h is subtracted, and an overwriting is performed (S32). Also, based on this, whether or not the value of the address 01h becomes 00h is judged (S33).

In the case of the chip C2, at the step 33, the value of the address 01h becomes 00h if 1 is subtracted from 01h. Thus, the step shifts to a step 35, and the address 00h is changed to 01h. Then, the CPU 10 downloads the firmware on the SDRAM from the serial interface 18 to the slave chip C2 (S34) and completes the starting process.

Also, the chip C3 begins the starting process through the boot loader similarly to the chip C2, in response to the reset release (the turning-on of the power source or the like) of the host 2 (S21), and sequentially checks the serial interruption and the PCI interruption (S22 and S23).

Here, when the chip C2 transfers the firmware to the chip C3 as described above, the serial interruption is performed on the CPU 10 of the chip C3. At the timing of this serial interruption, the CPU 10 of the chip C3 receives and analyzes the header and recognizes the size of the firmware (S30). Then, the CPU 10 receives the firmware corresponding to this size and stores in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory, and shifts the control from the boot loader to the firmware (S25).

In accordance with this firmware, the CPU 10 refers to the setting information on the SDRAM 31 and recognizes the operation mode (S26). Since the chip C3 in this example is the slave chip, in the setting information from the chip C2, the value of the address 00h is 00h. Hence, the CPU 10 judges that there is not the slave chip at the step 27, and completes the starting process.

As described above, according to this embodiment, the value of the address 01h is sequentially subtracted, and the firmware is transferred to the slave chip. As a result, even in the expansion board having the three or more chips, the reduction in the start time can be attained.

Also, which of the chips C1, C2, and C3, or more each chip serves as can be judged from the address 00h of the SDRAM 31.

Third Embodiment

Figure 8:
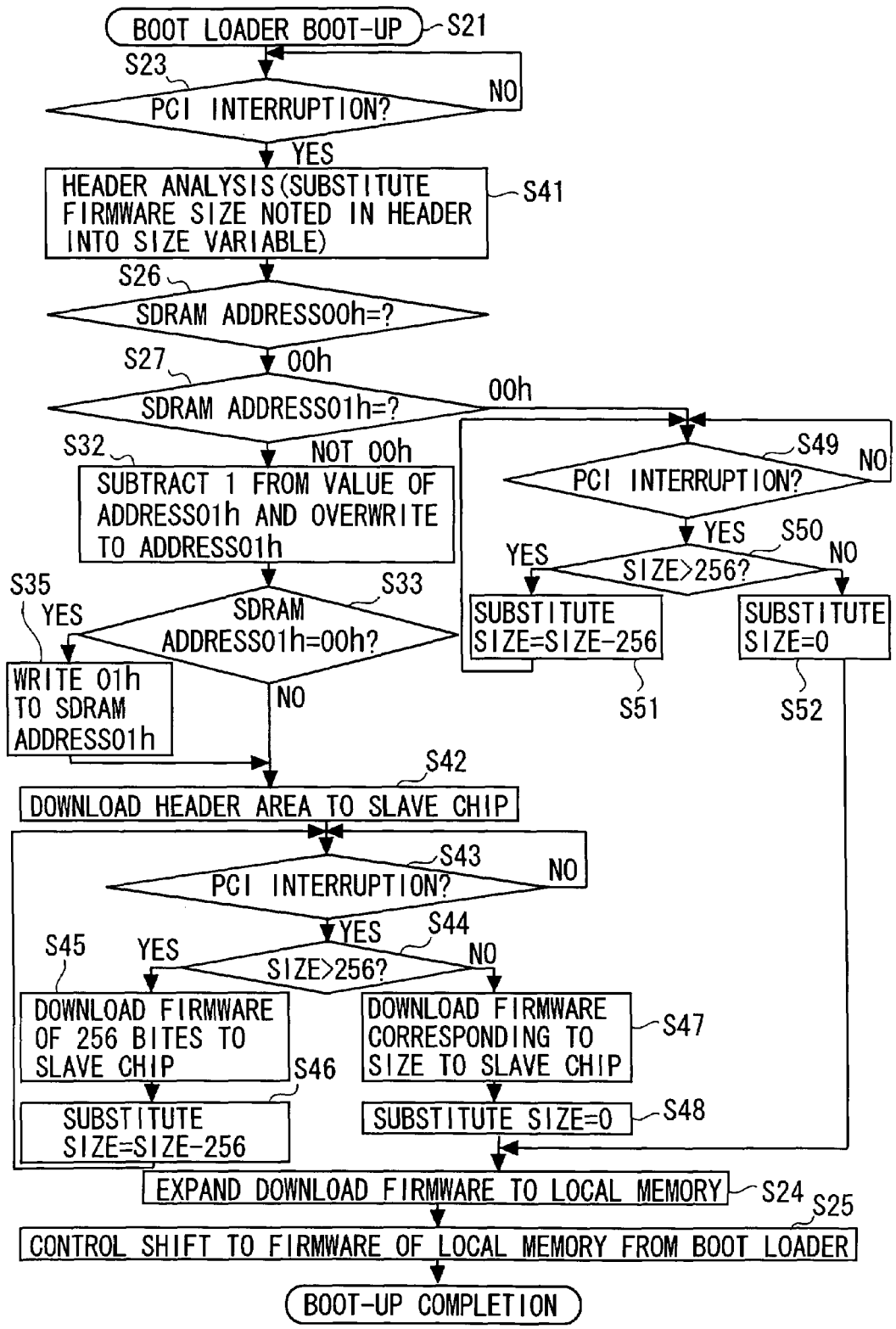
FIG. 8 is a flowchart of a starting process according to a third embodiment.

FIG. 8 is a flowchart of a starting process according to the third embodiment. This embodiment differs from the second embodiment in that the transfer to the slave chip begins before the firmware is completely downloaded. The other configurations are equal. Note that, in this embodiment, the same symbols are given to the same components as those of the second embodiment, and the re-explanations are partially omitted.

The expansion board 1a according to this embodiment includes the chips C1, C2, and C3 as shown in FIG. 6. The CPU of each of the chips C1, C2, and C3 according to this embodiment also functions as a setting information report unit reporting the header area including the setting information to another chip, prior to the transfer of the main portion (the data portion) of the firmware to another chip (the slave chip), or prior to the completion of the firmware.

The host 2 begins starting the expansion board 1a (the chips C1, C2, and C3) (S11) when the reset state is released, and writes the firmware to the SDRAM 31 of the chip C1 through the PCI bus 24 (S12).

Then, the host 2, each time writing the firmware of 256 bytes, sets a flag for a predetermined register of the PCI and performs the PCI interruption. Note that, even if it does not finally reach the 256 bytes, the PCI interruption is performed (S13).

On the other hand, the chip C1 begins the starting process through the boot loader in response to the reset release (the turning-on of the power source or the like) of the host 2, as shown in FIG. 8 (S21).

At first, the CPU 10 of the chip C1 checks whether or not the PCI interruption is performed (S23). That is, the CPU 10 refers to whether or not the flag for the PCI interruption is set for the memory of the PCI interface 17. Here, the CPU 10 waits until the PCI interruption is performed if there is not the PCI interruption. The CPU 10 accesses the SDRAM 31, if the PCI interruption is performed, and analyzes the header of the firmware (S41). As a result, the CPU 10 acquires the size of the firmware and substitutes this size into a SIZE variable.

Then, the CPU 10 refers to the setting information and recognizes the operation mode (S26 and S27). The chip C1 in this example is the master chip, and the slave chip (the chip C2) is connected. Thus, in the setting information from the host 2, the value of the address 00h is 00h, and the value of the address 01h is 02h. Hence, the CPU 10 judges that there are two slave chips at the step 27, and changes the setting information on the SDRAM for the slave chip. Specifically, the value of the address 01h is subtracted (S32), and it is judged whether or not the value of the address 01h becomes 00h based on the subtraction (S33). In the case of the chip C1, at the step 33, the value of the address 01h becomes 01h even if 1 is subtracted from 02h. Hence, without any change in the address 00h, it is shifted to the step 34, and the header area of the firmware on the SDRAM is downloaded from the serial interface 18 to the slave chip C2 (S42).

Here, the CPU 10 waits until a next PCI interruption is performed (S43), and transfers the firmware corresponding to a new reception at the timing of the PCI interruption to the slave chip C3. That is, at the step 44, if the SIZE variable exceeds 256 bytes, the CPU 10 transfers the firmware of 256 bytes to the chip C3, and sets a flag for a predetermined register of the chip C2 and performs the PCI interruption (S45) and subtracts the value of the SIZE variable by 256 bytes and then returns to the step 43 (S46). Also, at the step 43, if the SIZE variable does not exceed 256 bytes, the CPU 10 transfers the firmware corresponding to the SIZE variable (S47), sets the value of the SIZE variable to 0, sets a flag for a predetermined register of the chip C2, and performs the PCI interruption and then completes the transfer of the firmware (S48).

When the transfer of this firmware has been completed, the CPU 10 reads the firmware from the SDRAM 31 and expands to the local memory inside the CPU 10 (S24).

After the expansion, the CPU 10 executes the firmware on this local memory, shifts the control from the boot loader to the firmware, and then completes the starting process (S25).

On the other hand, the chip C2 begins the starting process through the boot loader in response to the reset release (the turning-on of the power source or the like) of the host 2 (S21).

At first, the CPU 10 of the chip C2 checks whether or not the PCI interruption is performed (S23). That is, the CPU 10 refers to whether or not the flag for the PCI interruption is set for the memory of the PCI interface 17. Here, the CPU 10 waits until the PCI interruption is performed if there is not the PCI interruption, and accesses the SDRAM 31 if the PCI interruption is performed, and analyzes the header of the firmware (S41). As a result, the CPU 10 acquires the size of the firmware and substitutes this size into a SIZE variable.

Then, the CPU 10 refers to the setting information and recognizes the operation mode (S26 and S27). The chip C2 in this example is the master chip for the chip C3, and the slave chip (the chip C3) is connected. Thus, in the setting information from the chip C1, the value of the address 00h is 00h, and the value of the address 01h is 01h. Hence, the CPU 10 judges that there is one slave chip at the step 27, and changes the setting information on the SDRAM for the slave chip. Specifically, the value of the address 01h is subtracted (S32). Hence, the value of the address 01h becomes 00h, the value of the address 00h is changed to 01h (S35), and the header area of the firmware on the SDRAM is downloaded from the serial interface 18 to the slave chip C3 (S42).

Here, the CPU 10 waits until a next PCI interruption is performed (S43), and transfers the firmware corresponding to a new reception at the timing of the PCI interruption to the slave chip C3. That is, at the step 44, if the SIZE variable exceeds 256 bytes, the CPU 10 transfers the firmware of 256 bytes to the chip C3, sets a flag for a predetermined register of the chip C3, performs the PCI interruption (S45), subtracts the value of the SIZE variable by 256 bytes, and then returns to the step 43 (S46). Also, at the step 43, if the SIZE variable does not exceed 256 bytes, the CPU 10 transfers the firmware corresponding to the SIZE variable (S47), sets the value of the SIZE variable to 0, sets a flag for a predetermined register of the chip C3, performs the PCI interruption, and then completes the transfer of the firmware (S48).

When the transfer of this firmware has been completed, the CPU 10 reads the firmware from the SDRAM 31 and expands to the local memory inside the CPU 10 (S24).

After the expansion, the CPU 10 executes the firmware on this local memory, shifts the control from the boot loader to the firmware, and then completes the starting process (S25).

On the other hand, the chip C3 begins the starting process through the boot loader in response to the reset release (the turning-on of the power source or the like) of the host 2 (S21).

At first, the CPU 10 of the chip C3 checks whether or not the PCI interruption is performed (S23). That is, the CPU 10 refers to whether or not the flag for the PCI interruption is set for the memory of the PCI interface 17. Here, the CPU 10 waits until the PCI interruption is performed if there is not the PCI interruption, and accesses the SDRAM 31 if the PCI interruption is performed to analyze the header of the firmware (S41). As a result, the CPU 10 acquires the size of the firmware and substitutes this size into a SIZE variable.

Then, the CPU 10 refers to the setting information and recognizes the operation mode (S26 and S27). The chip C3 in this example is the slave chip. Thus, in the setting information from the chip C2, the value of the address 00h is 01h, and the value of the address 01h is 00h.

Thus, the CPU 10 judges that there is not the slave chip at the step 27, and carries out only the downloading without transferring the firmware (S49 to S52). That is, when this PCI interruption is performed, the CPU 10 judges whether or not the SIZE variable exceeds 256 bytes (S50), and if the SIZE variable exceeds 256 bytes, the CPU 10 subtracts the SIZE variable by 256 bytes and returns to the step 49 (S51). Also, at the step 50, if the size does not exceed the SIZE variable, the SIZE variable is set to 0, and the downloading has been completed (S52).

When the downloading of this firmware has been completed, the CPU 10 reads the firmware from the SDRAM 31 and expands to the local memory inside the CPU 10 (S24).

After the expansion, the CPU 10 executes the firmware on this local memory, shifts the control from the boot loader to the firmware, and then completes the starting process (S25).

As described above, according to this embodiment, before the firmware is perfectly downloaded, the transfer to the slave chip can be started, which can quickly start the slave chip.

Fourth Embodiment

Figure 9:
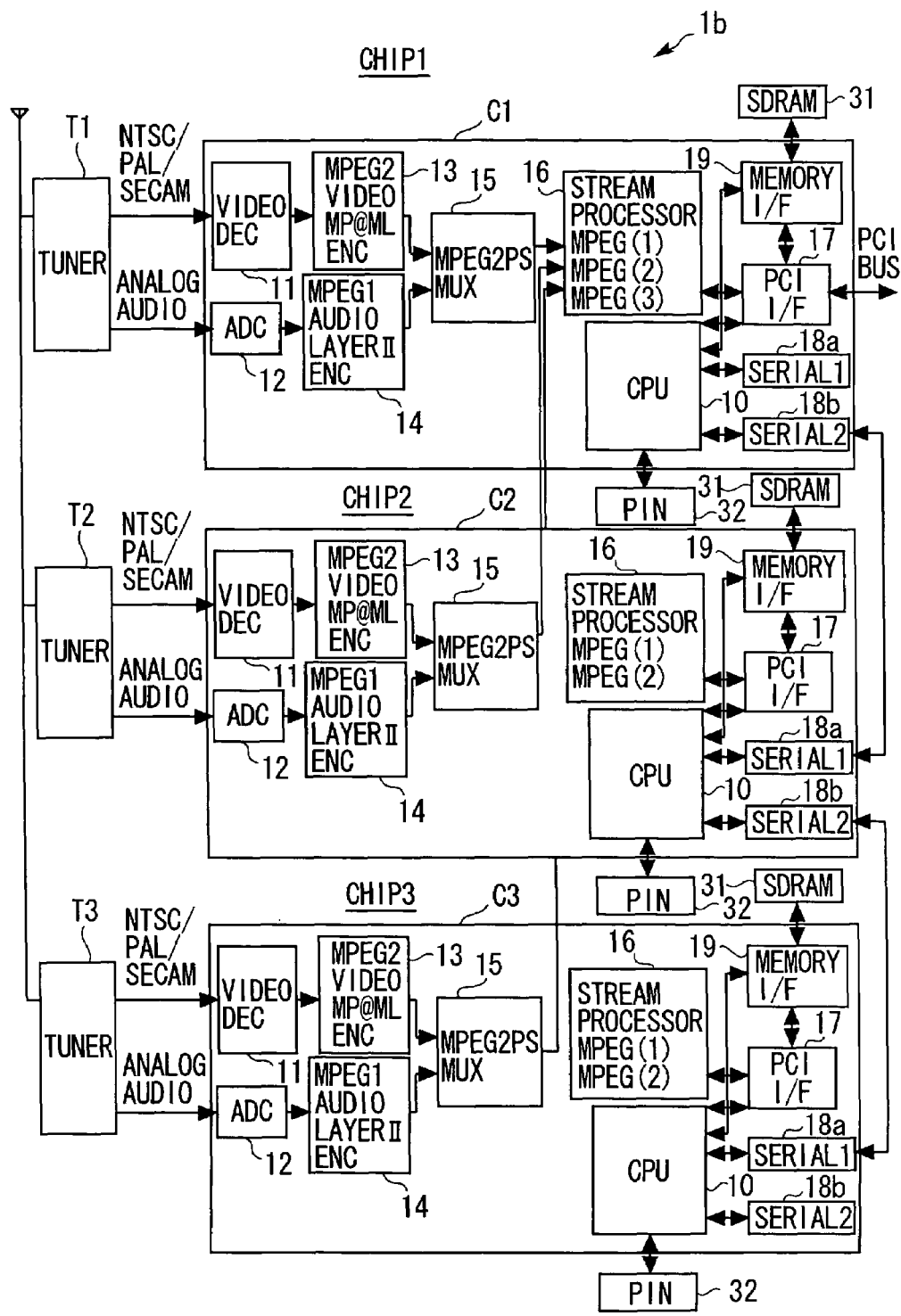
FIG. 9 is a block diagram of an expansion board according to a fourth embodiment.
Figure 10:
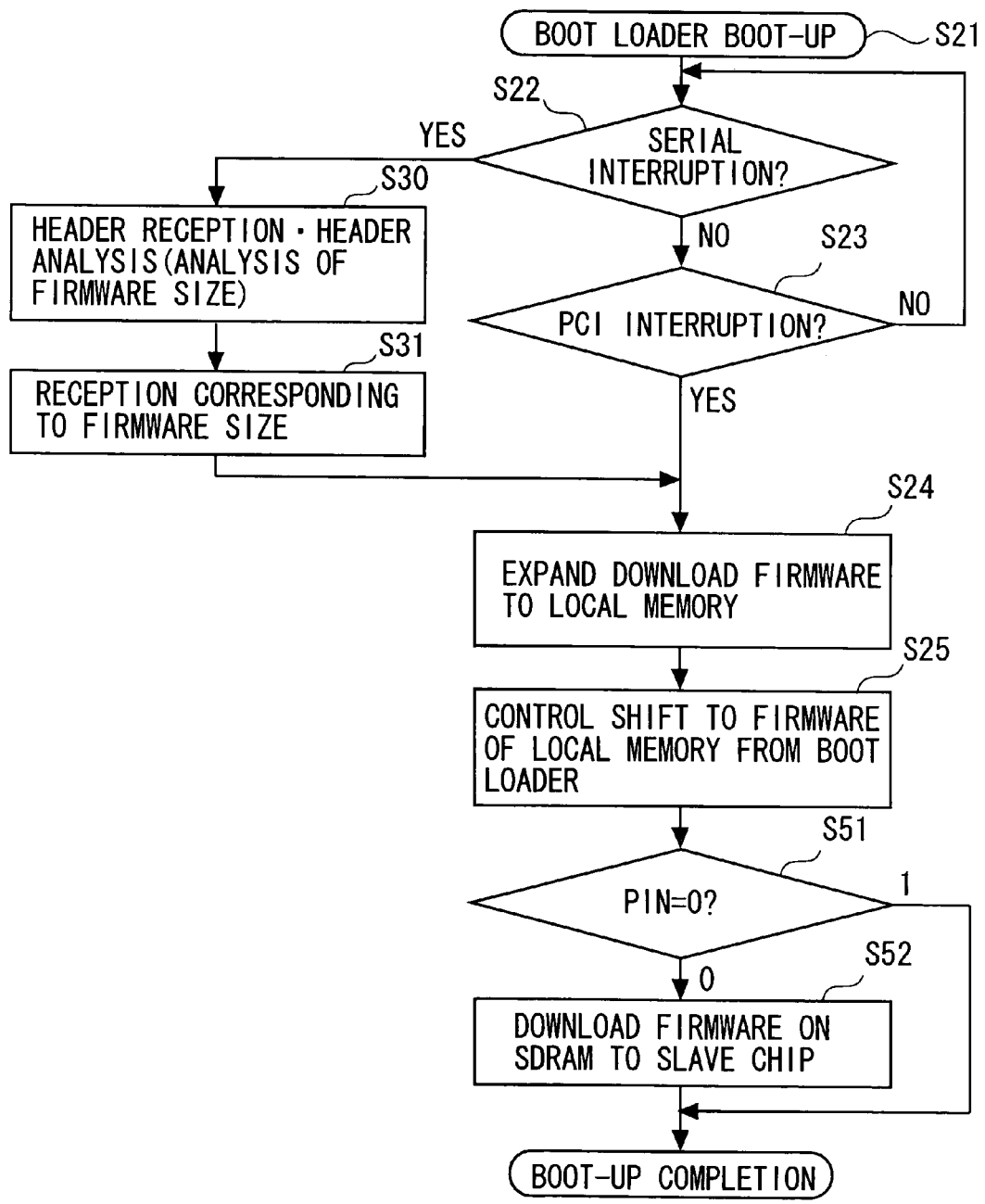
FIG. 10 is a flowchart of a starting process according to the fourth embodiment.

FIG. 9 is a block diagram of an expansion board according to the fourth embodiment, and FIG. 10 is a flowchart of a starting process according to the fourth embodiment. This embodiment differs from the second embodiment in that the operation mode is not set in the header area but is set in a pin installed in each chip, and the other configuration is the same. Note that, in this embodiment, the same reference symbols are given to the components equal to those of the second embodiment, and the re-explanations are partially omitted.

An expansion board 1b according to this embodiment includes the chips C1, C2, and C3 of the same configuration as shown in FIG. 9, in a moniliform manner. The chip C2 serves as the slave chip for the chip C1. However, the chip C2 serves as the master chip for the chip C3. Each of the chips C1, C2, and C3 is connected to the pin 32 indicating whether or not it serves as a master chip, respectively. The pin 32 can be set at a state of 0 or 1. The state of 0 indicates the master chip, and the state of 1 indicates the slave chip.

The host 2 begins the start of the expansion board 1a (the chips C1, C2, and C3) (S11) when the reset state is released, and writes the firmware to the SDRAM 31 of the chip C1 through the PCI bus 24 (S12).

Then, the host 2 sets a flag for a predetermined register of the PCI, and begins the expansion of the firmware (S13).

On the other hand, the chip C1 begins the starting process through the boot loader in response to the reset release (the turning-on of the power source or the like) of the host 2, as shown in FIG. 10 (S21).

At first, the CPU 10 of the chip C1 checks whether or not the serial interruption is performed (S22). If there is not the serial interruption, the CPU 10 of the chip C1 checks whether or not a PCI interruption is performed (S23). That is, the CPU 10 refers to whether or not the flag for the PCI interruption 6 is set for the memory of the PCI interface 17. Here, the CPU 10 returns to the step 22 if there is not the PCI interruption, and if there is the PCI interruption, the CPU 10 reads the firmware from the SDRAM 31 at this time, and expands to a local memory inside the CPU 10 (S24).

After the expansion, the CPU 10 executes the firmware on this local memory, and shifts the control from the boot loader to the firmware (S25).

In accordance with this firmware, the CPU 10 refers to a pin setting information and recognizes the operation mode (S51). That is, the CPU 10 refers to the state of the pin 32, and if the pin 32 is set to 1, the CPU 10 recognizes that the chip is not the master chip (the transferring of the firmware is not required), and stops the starting process, and if the pin 32 is set to 0, the CPU 10 recognizes that the chip is the master chip, and transfers the firmware (S52). The chip C1 in this example is the master chip, and the slave chip (the chip C2) is connected. Thus, the pin 32 is set to 0. Hence, the CPU 10 judges that there is the slave chip, transfers the firmware on the SDRAM from the serial interface 18 to the slave chip C2, and completes the starting process.

Also, the chip C1, if recognizing that the PCI interruption is performed at the step 23, sets the operation mode so as to output the generated stream or the stream received from the other chips C2 and C3 from the PCI interface 17 to the host 2.

On the other hand, the chip C2 begins the starting process through the boot loader similarly to the chip C1, in response to the reset release (the turning-on of the power source or the like) of the host 2 (S21) and sequentially checks the serial interruption and the PCI interruption (S22 and S23).

Here, when the chip C1 transfers the firmware to the chip C2 as described above, the serial interruption is performed on the CPU 10 of the chip C2. At the timing of this serial interruption, the CPU 10 of the chip C2 receives and analyzes the header, and recognizes the size of the firmware (S30). Then, the CPU 10 receives the firmware corresponding to this size and stores in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory, and shifts the control from the boot loader to the firmware (S25).

In accordance with this firmware, the CPU 10 refers to the pin setting information and recognizes the operation mode (S51). Since the chip C2 serves as the master chip for the chip C3, the pin 32 is set to 0. Thus, the CPU 10 judges that there is the slave chip, transfers the firmware on the SDRAM from the serial interface 18 to the slave chip C3, and completes the starting process (S52).

On the other hand, the chip C3 begins the starting process through the boot loader similarly to the chip C2, in response to the reset release (the turning-on of the power source or the like) of the host 2 (S21) and sequentially checks the serial interruption and the PCI interruption (S22 and S23).

Here, when the chip C2 transfers the firmware to the chip C3 as described above, the serial interruption is performed on the CPU 10 of the chip C3. At the timing of this serial interruption, the CPU 10 of the chip 3 receives and analyzes the header, and recognizes the size of the firmware (S30). Then, the CPU 10 receives the firmware corresponding to this size and stores in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory, and shifts the control from the boot loader to the firmware (S25).

In accordance with this firmware, the CPU 10 refers to the pin setting information and recognizes the operation mode (S51). Since the chip C3 according to this embodiment is the slave chip, the pin 32 is set to 1. Then, the firmware is not transferred, and the starting process is completed.

As described above, according to this embodiment, without rewriting the header area, the reduction in the start time is attained.

Fifth Embodiment

Figure 11:
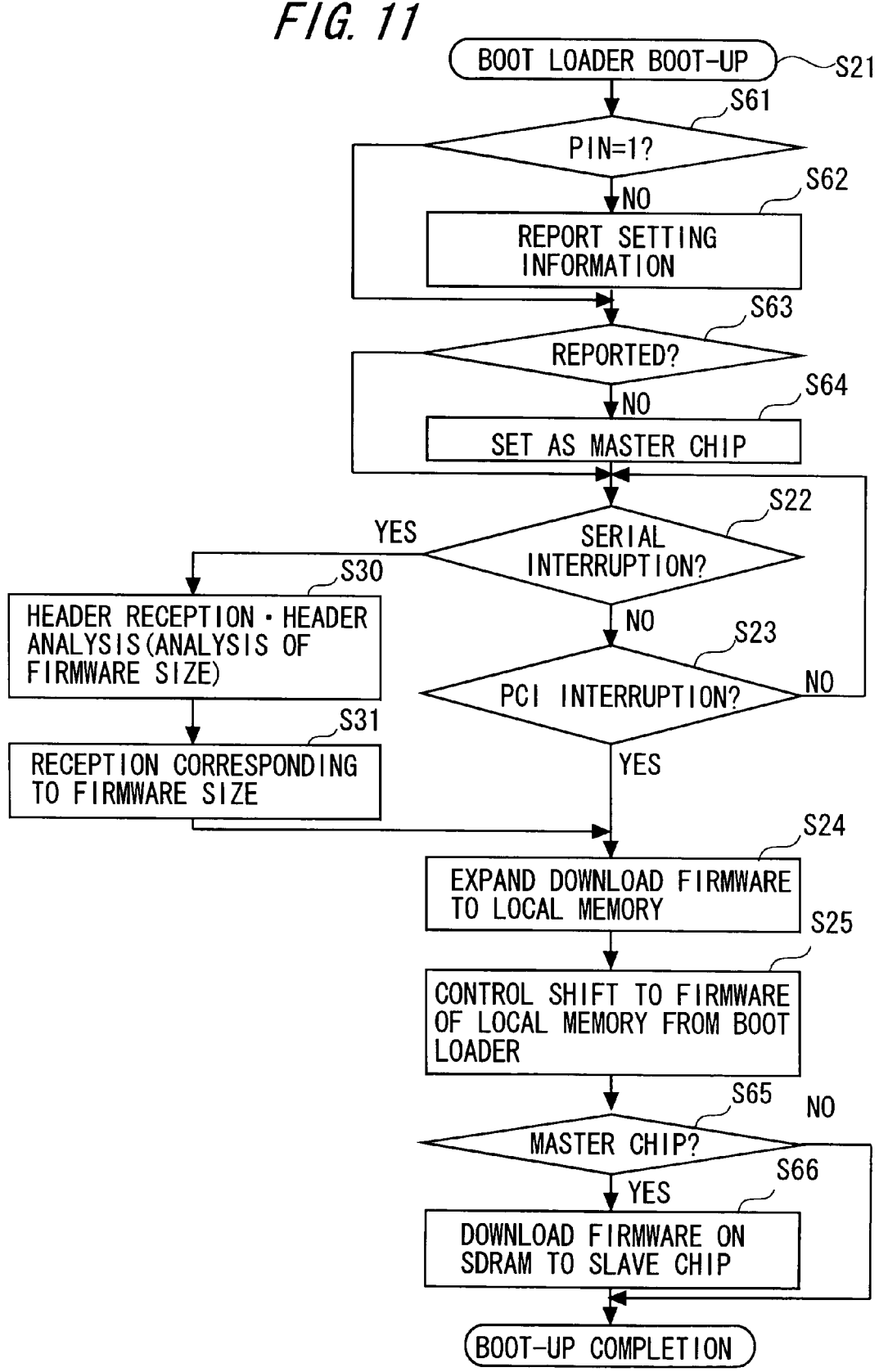
FIG. 11 is a flowchart of the starting process according to a fifth embodiment.

FIG. 11 is a flowchart of the starting process according to the fifth embodiment. This embodiment differs from the fourth embodiment in that in accordance with the setting of the pin installed in each chip, the slave chip reports the setting information to the master chip, and the other configuration is the same. In this embodiment, the same reference symbols are given to the components equal to those of the fourth embodiment, and the re-explanations are partially omitted. The hardware configuration according to this embodiment is equal to the configuration shown of FIG. 9 of the fourth embodiment. Note that, the CPU of each of the chips C1, C2, and C3 according to this embodiment also functions as a unit reporting the setting information (the information indicating the connection of the slave chip) to the other chips (the master chip).

In this embodiment, the pin 32 installed in each of the chips C1, C2, and C3 of the expansion board 1b can be set to 0 or 1. The state of 1 indicates that the chip is the slave chip, and the state of 0 indicates that the chip is not the slave chip.

When the reset state is released, the host 2 begins the start of the expansion board 1b (the chips C1, C2, and C3) (S11), and writes the firmware to the SDRAM 31 of the chip C1 through the PCI bus 24 (S12).

Then, the host 2 sets a flag for a predetermined register of the PCI, performs the PCI interruption, and then begins the expansion of the firmware (S13).

On the other hand, each of the chips C1, C2, and C3 begins the starting process through the boot loader in response to the reset release of the host 2, as shown in FIG. 11 (S21).

Each of the chips C1, C2, and C3 firstly refers to the state of the pin 32 (S61). In this embodiment, the pin 32 of the chip C3 is set to 1. Thus, the CPU 10 of the chip C3 recognizes that the chip C3 is the slave chip, sets the operation mode, and also transmits the setting information to the master chip C2 (S62). Then, since the chip C3 does not receive the setting information, this passes a step 63 and waits until the serial interruption is performed (S22 and S23).

Also, the CPU 10 of the chip C2 refers to the state of the pin 32 (S61), and since the state is at 1, the CPU 10 of the chip C2 sets the operation mode as the slave chip and transmits the setting information to the master chip C1 (S62). Then, the CPU 10 of the chip C2 judges whether or not there was the reception of the setting information (S63), and also sets the operation mode as the master chip because of the reception from the chip C3 (S64). After that, the CPU 10 of the chip C2 waits until the serial interruption is performed (S22 and S23).

On the other hand, the CPU 10 of the chip C1 refers to the state of the pin 32 (S61), and since the state is at 0, the CPU 10 of the chip C1 passes the step 62. Then, the CPU 10 of the chip C1 judges whether or not there was the reception of the setting information (S63), and sets the operation mode as the master chip because of the reception from the chip C2 (S64).

Next, the CPU 10 of the chip C1 checks whether or not the serial interruption is performed (S22). If there is not the serial interruption, the CPU 10 checks whether or not a PCI interruption is performed (S23). That is, the CPU 10 refers to whether or not the flag for the PCI interruption is set for the memory of the PCI interface 17. Here, the CPU 10 returns to the step 22 if there is not the PCI interruption, and if there is the PCI interruption, the CPU 10 reads the firmware from the SDRAM 31 at this time, and expands to a local memory inside the CPU 10 (S24).

After the expansion, the CPU 10 executes the firmware on this local memory, and shifts the control from the boot loader to the firmware (S25).

With the control of this firmware, the CPU 10 refers to the operation mode (S65), and if the chip is not the master chip, the CPU 10 completes the starting process, and if the chip is the master chip, the CPU 10 transfers the firmware (S66). The chip C1 in this example is the master chip, and the slave chip (the chip C2) is connected. Thus, the firmware is transferred from the serial interface 18 to the slave chip C2, and the starting process is completed.

Note that, the chip C1, when recognizing that the chip C1 is not the slave chip at the step 61, sets the operation mode so as to output the stream generated by the own MUX 15 or the stream received from the other chips C2 and C3 from the PCI interface 17 to the host 2.

Also, in the chip C2, when the firmware is transferred by the chip C1 and the serial interruption is performed, at the timing of this serial interruption, the CPU 10 receives and analyzes the header, and recognizes the size of the firmware (S30). Then, the CPU 10 receives the firmware corresponding to this size and stores the firmware in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory, and shifts the control from the boot loader to the firmware (S25).

With the control of this firmware, the CPU 10 refers to the operation mode (S65). Since the chip C2 in this example serves as the master chip for the chip C3, the CPU 10 transfers the firmware on the SDRAM from the serial interface 18 to the slave chip C3, and completes the starting process (S66).

Also, in the chip C3, when the firmware is transferred by the chip C2 and the serial interruption is performed, at the timing of this serial interruption, the CPU 10 receives and analyzes the header, and recognizes the size of the firmware (S30). Then, the CPU 10 receives the firmware corresponding to this size and stores the firmware in the SDRAM 31 (S31).

When the reception of the firmware has been completed, the CPU 10 reads the firmware from the SDRAM 31 and expands to the local memory inside the CPU 10 (S24).

After the expansion, the CPU 10 executes the firmware on this local memory, and shifts the control from the boot loader to the firmware (S25).

With the control of this firmware, the CPU 10 refers to the operation mode (S65). The chip C3 in this example is not the master chip. Thus, without any transfer of the firmware, the starting process is completed.

As described above, according to this embodiment, without rewriting the header area, the reduction in the start time is attained.

Others

The present invention is not limited only to the examples described above. Within the range not departing from the scope and spirit of the present invention, various modifications can be naturally added.

What is claimed is:

1. A chip carrying out an information processing in accordance with firmware which is at least a part of the firmware common to the other chip, the chip comprising:
   a receiving unit to receive the firmware;
   a memory to store the received firmware;
   a referring unit to refer to setting information included in the received firmware;
   a changing unit to change the setting information to setting information for the other chip of a transfer destination; and
   a transferring unit to transfer the received firmware from the memory to the other chip.

2. The chip according to claim 1,
   wherein the setting information indicates a presence or absence of a slave chip, and
   the transferring unit transfers the firmware when the setting information indicates there is the slave chip, and does not transfer the firmware when the setting information indicates there is no slave chip.

3. The chip according to claim 1,
   wherein the setting information indicates a number of the slave chips; and
   the changing unit subtracts the number of the slave chips.

4. The chip according to claim 1, which transfers the firmware by using the transferring unit in parallel to a reception of the firmware through the receiving unit.

5. The chip according to claim 1,
   wherein the referring unit refers to a state of a pin indicating setting information,
   wherein the transferring unit transfers the firmware to the other chip based on the pin indicating the setting information.

6. The chip according to claim 1, further comprising:
   a setting information reporting unit to report setting information to the other chip before the transfer unit transfers the firmware to the other chip,
   wherein transferring unit transfers the firmware to the other chip based on setting information.

7. The chip according to claim 1, further comprising:
   a reporting unit to report setting information to the other chip.

8. A starting method for a chip, the chip carrying out information processing in accordance with firmware which is at least a part of firmware common to another chip, the method including:
   receiving the firmware;
   storing the received firmware, in a memory;
   referring to setting information included in the received firmware;
   changing the setting information to setting information for the other chip of a transfer destination; and
   transferring the received firmware to the other chip from the memory.

9. The starting method according to claim 8,
   wherein the setting information indicates a presence or absence of a slave chip, and
   the transferring transfers the firmware when the setting information indicates there is the slave chip, and does not transfer the firmware when the setting information indicates there is no slave chip.

10. The starting method according to claim 8,
    wherein the setting information indicates the number of the slave chips; and
    the changing of the setting information subtracts the number of the slave chips.

11. The starting method according to claim 8, including transferring the firmware in parallel to a reception of the firmware.

12. The starting method according to claim 8, the method further comprising:
    referring to a state of a pin indicating setting information,
    wherein the transferring transfers the firmware to the other chip based on the pin indicating the setting information.

13. A recording medium storing a program to be executed by chip, the chip carrying out information processing in accordance with firmware which is at least a part of firmware common to another chip, the program causing the chip to execute a method comprising:
    receiving the firmware;
    storing the received firmware in a memory;
    referring to setting information included in the received firmware;
    changing the setting information to setting information for the other chip of a transfer destination; and
    transferring the received firmware from the memory to the other chip.

14. The recording medium according to claim 13,
    wherein the setting information indicates a presence or absence of a slave chip, and the transferring transfers the firmware when the setting information indicates there is the slave chip, and does not transfer the firmware when the setting information indicates there is no slave chip.

15. The recording medium according to claim 13, wherein the setting information indicates the number of the slave chips; and the changing of the setting information subtracts the number of the slave chips.

16. The recording medium according to claim 13, the program causing the chip to transfer the firmware in parallel to a reception of the firmware.

17. The recording medium according to claim 13, the method further comprising:

referring to a state of a pin indicating setting information, wherein the transferring transfers the firmware to the other chip based on the pin indicating the setting information.

18. An apparatus comprising:

a plurality of chips, at least one of the chips carrying out information processing in accordance with firmware which is common to other chips, the at least one of the chips including:

a receiving unit to receive the firmware;

a memory to store the received firmware;

a referring unit to refer to setting information included in the received firmware;

a changing unit to change the setting information to setting information for the other chip of a transfer destination; and transferring unit to transfer the received firmware from the memory to the other chips.

19. The apparatus according to claim 18, wherein the setting information indicates a presence or absence of a slave chip, and the transferring unit transfers the firmware when the setting information indicates there is the slave chip, and does not transfer the firmware when the setting information indicates there is no slave chip.

20. The apparatus according to claim 18, wherein the setting information indicates the number of the slave chips; and the changing unit subtracts the number of the chips.

21. The apparatus according to claim 18, wherein the transferring unit transfers the firmware in parallel to a reception of the firmware through the receiving unit.

22. The starting method according to claim 8, further comprising:

reporting setting information to the other chip, wherein the transferring transfers the firmware to the other chip after the reporting.

23. The starting method according to claim 8, further comprising:

reporting setting information to the other chip.

* * * * *